(12) United States Patent
Cavalcanti et al.

(10) Patent No.: US 12,726,798 B2
(45) Date of Patent: Sep. 1, 2026

(54) PROXY COORDINATED WIRELESS COMMUNICATION OPERATION FOR VEHICULAR ENVIRONMENTS

(71) Applicant: Apple Inc., Cupertino, CA (US)

(72) Inventors: Dave Cavalcanti, Portland, OR (US); Anna Lucia Pinheiro, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/921,746

(22) Filed: Jul. 6, 2020

(65) Prior Publication Data

US 2022/0007187 A1 Jan. 6, 2022
US 2022/0377549 A9 Nov. 24, 2022

Related U.S. Application Data

(63) Continuation of application No. 15/577,885, filed as application No. PCT/US2015/000251 on Dec. 23, 2015, now Pat. No. 10,708,734.

(60) Provisional application No. 62/186,614, filed on Jun. 30, 2015.

(51) Int. Cl.
*H04W 4/40* (2018.01)
*H04W 12/06* (2021.01)
*H04W 92/18* (2009.01)

(52) U.S. Cl.
CPC .......... *H04W 4/40* (2018.02); *H04W 12/068* (2021.01); *H04W 92/18* (2013.01)

(58) Field of Classification Search
None
See application file for complete search history.

(56) References Cited

U.S. PATENT DOCUMENTS 4,999,833 A * 3/1991 Lee .................... G06N 5/022 370/428
6,233,228 B1 * 5/2001 Collar .............. H04M 1/72513 370/310
9,066,321 B1 * 6/2015 Kikta .................. H04W 76/10
10,045,249 B2 * 8/2018 Lee .................... H04W 76/14
(Continued)

FOREIGN PATENT DOCUMENTS

CN 102769661 A 11/2012
CN 103179575 A 6/2013
(Continued)

OTHER PUBLICATIONS

U.S. Appl. No. 62/097,589, filed Dec. 30, 2014 to Lee, Youngdae; “Bi-directional Connectionless Transmission for UE-to-UE communication via eNB”, p. 1-30.*
(Continued)

*Primary Examiner* — Gregory B Sefcheck
(74) *Attorney, Agent, or Firm* — Flare IP PLLC

(57) ABSTRACT

Proxy coordinated wireless communication operation is described for vehicular environments. In one example, a first user equipment receives a proxy operation authorization from a vehicular environment proximity services function for the first user equipment to operate as a Proxy for the proximity services function. The first user equipment then controls configuration information of other user equipment.
(Continued)

The first user equipment also controls the vehicular environment operation mode used by the other user equipment.

20 Claims, 9 Drawing Sheets

(56) References Cited

U.S. PATENT DOCUMENTS

| | | | | |
|---|---|---|---|---|
| 10,091,760 | B2* | 10/2018 | Lee | H04W 12/08 |
| 10,231,217 | B2* | 3/2019 | Jung | H04W 72/0406 |
| 10,292,130 | B2* | 5/2019 | Lee | H04W 12/08 |
| 10,327,169 | B2* | 6/2019 | Lee | H04W 4/46 |
| 10,327,223 | B2* | 6/2019 | Lee | H04W 72/042 |
| 10,390,195 | B2* | 8/2019 | Kim | H04W 4/40 |
| 10,440,730 | B2* | 10/2019 | Jung | H04W 72/10 |
| 10,485,013 | B2* | 11/2019 | Lee | H04L 5/0094 |
| 10,506,548 | B2* | 12/2019 | Lee | H04W 76/14 |
| 10,531,418 | B2* | 1/2020 | Chun | H04W 8/005 |
| 10,645,549 | B2* | 5/2020 | Pinheiro | H04W 4/40 |
| 2007/0043506 | A1* | 2/2007 | Mudalige | G01C 21/00 701/469 |
| 2007/0284474 | A1* | 12/2007 | Olson | G05D 1/0022 244/10 |
| 2011/0140968 | A1 | 6/2011 | Bai et al. | |
| 2012/0282895 | A1 | 11/2012 | Bai et al. | |
| 2012/0327840 | A1* | 12/2012 | Chen | H04L 45/54 370/315 |
| 2013/0279392 | A1* | 10/2013 | Rubin | H04W 4/12 370/312 |
| 2014/0122607 | A1* | 5/2014 | Fodor | H04L 65/1069 709/204 |
| 2014/0143839 | A1* | 5/2014 | Ricci | H04N 21/41422 726/4 |
| 2015/0079906 | A1 | 3/2015 | Koo et al. | |
| 2015/0146605 | A1 | 5/2015 | Rubin et al. | |
| 2015/0170522 | A1* | 6/2015 | Noh | G08G 1/096741 701/117 |
| 2015/0199905 | A1* | 7/2015 | Hayee | G08G 1/22 701/118 |
| 2015/0381751 | A1* | 12/2015 | Haran | H04L 67/563 709/217 |
| 2016/0065362 | A1 | 3/2016 | Choyi et al. | |
| 2016/0156404 | A1 | 6/2016 | Wolfner et al. | |
| 2016/0204847 | A1 | 7/2016 | Ryu et al. | |
| 2016/0302072 | A1 | 10/2016 | Rydnell et al. | |
| 2016/0359545 | A1* | 12/2016 | Kodama | H04L 12/407 |
| 2016/0381491 | A1* | 12/2016 | Watfa | H04W 4/08 455/41.2 |
| 2017/0019812 | A1* | 1/2017 | Lee | H04W 4/46 |
| 2017/0024938 | A1* | 1/2017 | Lindsay | H04B 10/1129 |
| 2017/0126306 | A1* | 5/2017 | Kim | H04W 72/044 |
| 2017/0215123 | A1* | 7/2017 | Miranda d'Orey | H04W 40/20 |
| 2017/0230939 | A1* | 8/2017 | Rudolf | H04W 72/04 |
| 2018/0035276 | A1 | 2/2018 | Kang et al. | |
| 2018/0049104 | A1* | 2/2018 | Van Phan | H04W 84/10 |
| 2018/0063825 | A1* | 3/2018 | Van Phan | H04W 4/46 |
| 2018/0063852 | A1 | 3/2018 | Kang et al. | |
| 2018/0092017 | A1 | 3/2018 | Freda et al. | |
| 2018/0092112 | A1* | 3/2018 | Jung | H04W 72/566 |
| 2018/0110054 | A1 | 4/2018 | Jung et al. | |
| 2018/0139593 | A1* | 5/2018 | Chun | H04W 4/46 |
| 2018/0146491 | A1* | 5/2018 | Kim | H04W 24/10 |
| 2018/0152807 | A1* | 5/2018 | Van Phan | H04W 8/005 |
| 2018/0152819 | A1* | 5/2018 | Pinheiro | H04L 69/22 |
| 2018/0167790 | A1 | 6/2018 | Cavalcanti et al. | |
| 2018/0176850 | A1 | 6/2018 | Phan et al. | |
| 2018/0176891 | A1 | 6/2018 | Kim et al. | |
| 2018/0199181 | A1* | 7/2018 | Jung | H04W 72/0453 |
| 2018/0279120 | A1 | 9/2018 | Lehtovirta et al. | |
| 2018/0295655 | A1* | 10/2018 | Cavalcanti | H04W 12/35 |
| 2018/0310147 | A1 | 10/2018 | Kim et al. | |
| 2019/0356552 | A1* | 11/2019 | Ricci | G06F 3/0482 |

FOREIGN PATENT DOCUMENTS

| | | | |
|---|---|---|---|
| CN | 103856927 | A | 6/2014 |
| CN | 104081873 | A | 10/2014 |
| CN | 104185208 | A | 12/2014 |
| CN | 104270819 | A | 1/2015 |
| CN | 104272707 | A | 1/2015 |
| CN | 104469695 | A | 3/2015 |
| CN | 102769661 | B | 9/2015 |
| CN | 103856927 | B | 5/2017 |
| CN | 104185208 | B | 6/2017 |
| CN | 104272707 | B | 4/2018 |
| CN | 104270819 | B | 8/2018 |
| CN | 104081873 | B | 12/2018 |
| JP | 6705073 | B2 | 6/2020 |
| WO | 2014046575 | A1 | 3/2014 |
| WO | 2015002508 | A2 | 1/2015 |
| WO | 2015002508 | A3 | 5/2015 |

OTHER PUBLICATIONS

U.S. Appl. No. 62/183,936, filed Jun. 24, 2015 to Pinheiro et al.; "Enhancements to RAN Node to Support V2X Services in LTE/5G", p. 1-27.*

European Office Action and Search Report on the Patentability of Application No. 15897296.8-1213 mailed Apr. 23, 2021, 9 pages.

Chinese Office Action for Application No. 201580080295.0 dated Nov. 22, 2019, 28 pages.

Intel Corporation, "3GPP TSG RAN WG2 Meeting #89 R2-151111 Considerations on UE-toNW Relay for PreSe," Apr. 11, 2015.

Qualcomm Incorporated, "3GPP TSG-SA WG1 Meeting #68 S1-144374 V2X Communication in 3GPP," Nov. 5, 2014.

Intel Corporation, "3GPP TSG-RAN WG2 Meeting #90 R2-152258 Signaling considerations on eNB authorization of remote UE for UE-to-Network relay," May 16, 2015.

Ericsson, "3GPP TSG-RAN WG3 Meeting #88 R3-151067 ProSe UE Relaying Support," May 15, 2015.

Japanese Office Action for Application No. 2017-562044 dated Sep. 3, 2019, 10 pages.

Extended European Search Report for European Patent Application No. 15897296.8, dated Jan. 22, 2019, 19 pages.

Intel Corporation: "Signaling Considerations on eNB Authoriazation of Remote UE for UE-to-Network Relay," 3GPP Draft, R2-152258-Prose-Relay-Authorisation, 3rd Generation Partnership Project (3GPP), vol. RAN WG2, no. Fukuoka, Japan, May 2015, http://www.3gpp.org/flp/Meetings_3GPP _SYNC/RAN2/ Docs/, KP050973378, 4 pages.

Intel Corporation: "Considerations on UE-to-NW Relay for ProSe", 3GPP Draft, R2-151111, 3rd Generation Parternship Project {3GPP), Mobile Competence Center, vol. RAN WG2, no. Bratislava, Slovakia, Apr. 2015, http://www.3gpp.org/flp/Meetings_3GPP _SYNC/RAN2/Docs/, XP050936092, 19 pages.

Ericsson: "ProSe Relaying Support" 3GPP Draft, R3-151067, Mobile Competence Centre; vol. RAN WG3, no. Fukuoka, Japan, May 2015, XP050968776, http://www.3gpp.org/flp/Meetings_3GPP _SYNC/RAN3/Docs/, 3 pages.

PCT Notification of International Preliminary Report on Patentability and Written Opinion of the International Searching Authority for International Application No. PCT/US2015/000251, dated Jan. 11, 2018, 11 pages.

PCT International Search Report and Written Opinion of the International Authority for International Application No., PCT/US2015/000251, dated Apr. 27, 2016, 13 pages.

Qualcom Incorporated, "V2X Communication in 3GPP," S1-144374, 3GPP TSG-SA WG1 Meeting #68, San Francisco, USA, Nov. 5, 2014 , 7 pages.

Japanese Office Action and Search Report on the Patentability of Application No. 2020-018506 Mailed Mar. 9, 2022, 7 pages.

Decision to Grant received for Japanese Patent Application No. 2017-562044, mailed on Dec. 24, 2019, 5 pages (2 pages of English Translation and 3 pages of Original Document).

(56) References Cited

OTHER PUBLICATIONS

Decision to Grant received for Japanese Patent Application No. 2020-018506, mailed on Dec. 23, 2022, 6 pages (2 pages of English Translation and 4 pages of Original Document).
International Preliminary Report on Patentability received for PCT Patent Application No. PCT/US2015/000251, mailed on Jan. 11, 2018, 11 pages.
International Search Report and Written Opinion received for PCT Patent Application No. PCT/US2015/000251, mailed on Apr. 27, 2016, 13 pages.
Office Action received for Chinese Patent Application No. 201580080295.0, mailed on Apr. 28, 2020, 10 pages (6 pages of English Translation and 4 pages of Original Document).
Office Action received for Chinese Patent Application No. 201580080295.0, mailed on Dec. 22, 2019, 26 pages (13 pages of English Translation and 13 pages of Original Document).
Office Action received for Japanese Patent Application No. 2017-562044, mailed on Aug. 26, 2019, 9 pages (4 pages of English Translation and 5 pages of Original Document).
Office Action received for Japanese Patent Application No. 2020-018506, mailed on Apr. 26, 2021, 12 pages (6 pages of English Translation and 6 pages of Original Document).
Office Action received for Japanese Patent Application No. 2020-018506, mailed on Mar. 3, 2022, 8 pages (4 pages of English Translation and 4 pages of Original Document).
Supplementary European Search Report and Search Opinion received for European Application No. 15897296.8, mailed on Jan. 22, 2019, 18 pages.
Notification to Grant Patent Right for Invention received for Chinese Patent Application No. 201580080295.0, mailed on Nov. 23, 2020, 3 pages (2 pages of English Translation and 1 page of Original Document).
Office Action received for European Application No. 15897296.8, mailed on Apr. 14, 2023, 7 pages.
Final Office Action received for U.S. Appl. No. 15/577,885, mailed on Nov. 8, 2019, 15 pages.
Non-Final Office Action received for U.S. Appl. No. 15/577,885, mailed on Aug. 7, 2019, 18 pages.
Notice of Allowance received for U.S. Appl. No. 15/577,885, mailed on Apr. 17, 2020, 2 pages.
Notice of Allowance received for U.S. Appl. No. 15/577,885, mailed on Feb. 26, 2020, 7 pages.
Extended European Search Report received for European Patent Application No. 25196976.2, mailed on Nov. 10, 2025, 8 pages.

* cited by examiner

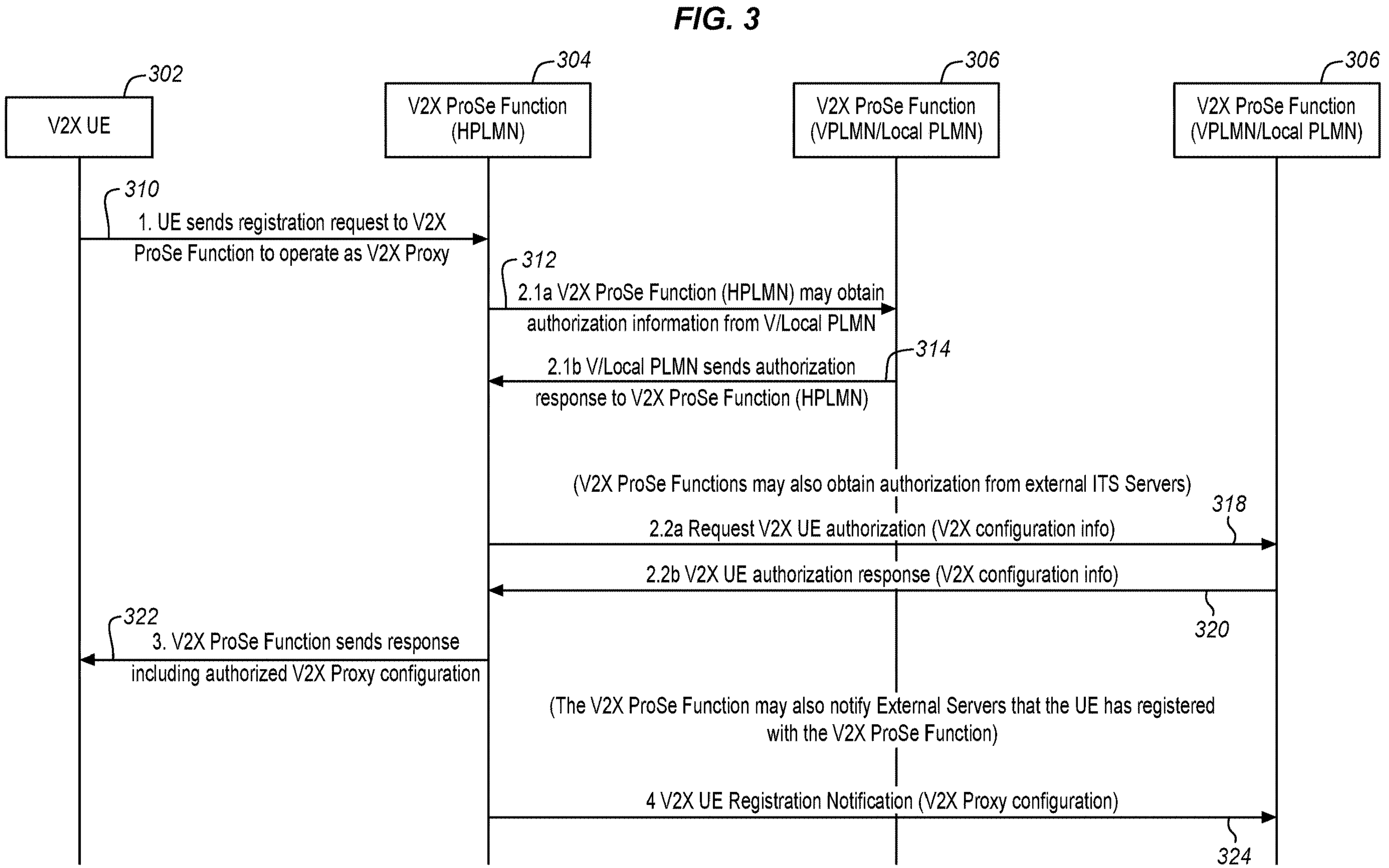
FIG. 3
302
V2X UE
304
V2X ProSe Function (HPLMN)
306
V2X ProSe Function (VPLMN/Local PLMN)
306
V2X ProSe Function (VPLMN/Local PLMN)
310
1. UE sends registration request to V2X ProSe Function to operate as V2X Proxy
312
2.1a V2X ProSe Function (HPLMN) may obtain authorization information from V/Local PLMN
314
2.1b V/Local PLMN sends authorization response to V2X ProSe Function (HPLMN)
(V2X ProSe Functions may also obtain authorization from external ITS Servers)
318
2.2a Request V2X UE authorization (V2X configuration info)
2.2b V2X UE authorization response (V2X configuration info)
320
322
3. V2X ProSe Function sends response including authorized V2X Proxy configuration
(The V2X ProSe Function may also notify External Servers that the UE has registered with the V2X ProSe Function)
4 V2X UE Registration Notification (V2X Proxy configuration)
324

FIG. 6

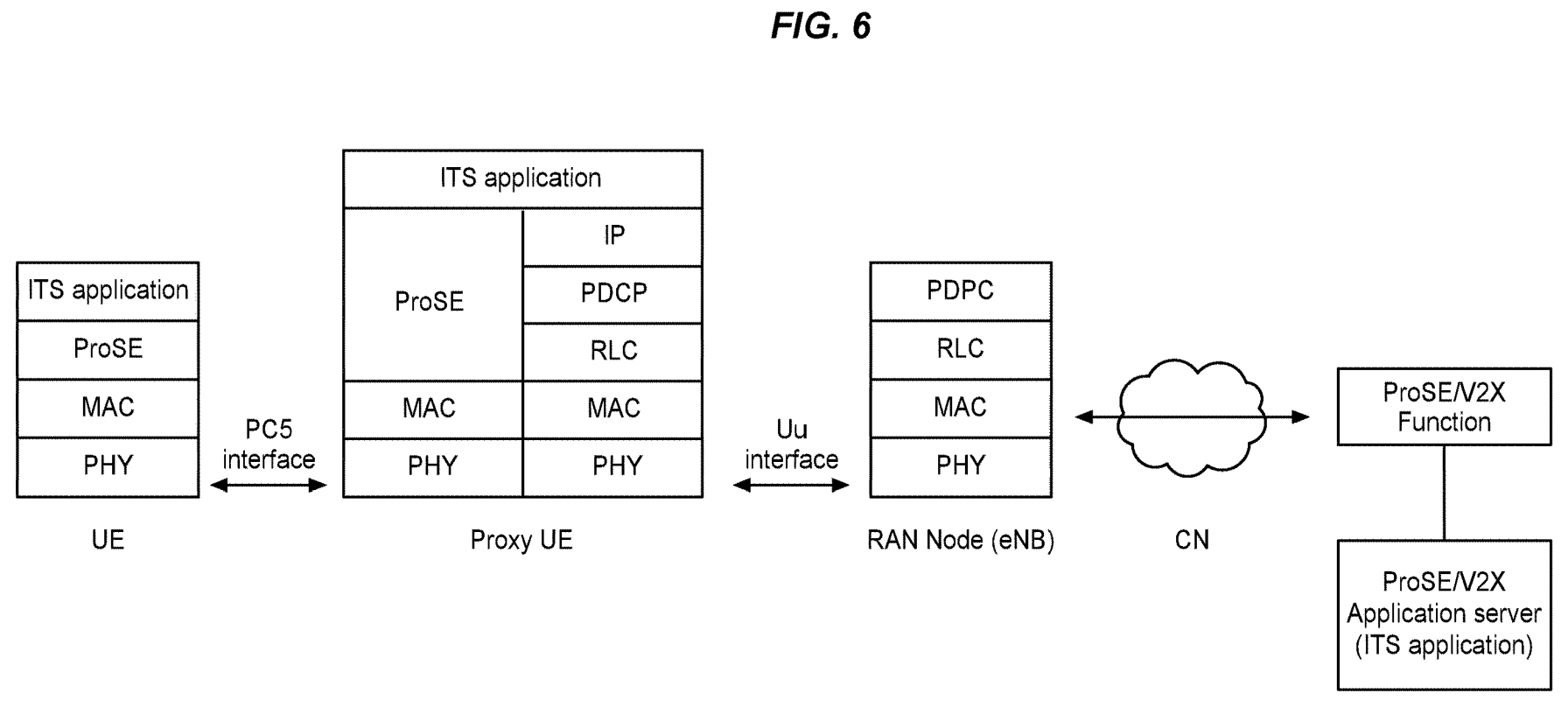

ITS application
ProSE
MAC
PHY
UE

PC5 interface

ITS application
ProSE
MAC
PHY
IP
PDCP
RLC
MAC
PHY
Proxy UE

Uu interface

PDPC
RLC
MAC
PHY
RAN Node (eNB)

CN

ProSE/V2X Function

ProSE/V2X Application server (ITS application)

PROXY COORDINATED WIRELESS COMMUNICATION OPERATION FOR VEHICULAR ENVIRONMENTS

CROSS-REFERENCE TO RELATED APPLICATIONS

This patent application is a continuation of and claims benefit of U.S. patent application Ser. No. 15/577,885, filed on Nov. 29, 2017 and entitled PROXY COORDINATED WIRELESS COMMUNICATION OPERATION FOR VEHICULAR ENVIRONMENTS which is a U.S. National Phase Application under 35 U.S.C. § 371 of International Application No. PCT/US2015/000251, filed Dec. 23, 2015, entitled PROXY COORDINATED WIRELESS COMMUNICATION OPERATION FOR VEHICULAR ENVIRONMENTS, which claims priority to U.S. Provisional Application No. 62/186,614, filed Jun. 30, 2015, entitled PROXY COORDINATED V2X OPERATION.

FIELD

The present description is related to wireless communications and in particular to proxy coordinated communication for wireless vehicle communications

BACKGROUND

Intelligent Transportation Systems (ITS) endeavor to improve safety and efficiency on roadways by adding intelligence to moving vehicles and also to fixtures on and around roadways. There are many different functions and purposes that could be enabled by ITS. Some of these include managing traffic flow and lane occupancy, collecting tolls, tracking freight, providing road condition alerts, alerting about pedestrians and other obstacles on the roadway, and the like. In addition to intelligent vehicles and fixtures, ITS seeks to allow vehicles to communicate with other vehicles and with other proximate devices on or near the roadway.

The Wireless Access in Vehicular Environments (WAVE) architecture and standards have been developed to support ITS safety and non-safety applications. Most ITS applications rely on the concept of situational awareness by the vehicles and the fixtures that is then enhanced by a co-operative awareness. The co-operative awareness is based on periodic and event-driven broadcast of basic safety messages (BSM) between vehicles (i.e., vehicle to vehicle (V2V) communication), between vehicles and infrastructure fixtures (i.e., vehicle to infrastructure (V2I) communications), and between vehicles and pedestrians (i.e., vehicle to pedestrian (V2P) communications). Collectively, V2V, V2I, and V2P communications are designated as vehicle to everything (V2X) communications.

In several ITS scenarios, Road Side Units (RSUs) are defined as communication nodes that are able to provide safety services (e.g. interaction collision warning) and non-safety (mobility information) services to vehicles and to other RSUs through broadcast messages.

V2X communications are provided in part by a dedicated short range communications (DSRC) channel, which may be carried by a local and metropolitan area network such as defined in the IEEE 802.11p standard and by a cellular network (e.g., long term evolution (LTE), fifth generation (5G), etc.). The 802.11p standard may use channels of 10 MHz bandwidth in the 5.9 GHz band (5.850-5.925 GHz). The DSRC may be one or more one-way or two-way short-range or medium-range wireless communication channels that are specifically designed for automotive vehicles. V2X devices may be equipped with multiple radios operating in different spectrum bands. Cellular networks may be used to assist V2X devices to discover and take advantage of safety and non-safety services, which may be broadcasted over one or more DSRC channels.

In order to send and receive messages in a DSRC 802.11p wireless local area network, a device (e.g. RSU or vehicle) sets up or discovers and joins a WAVE basic service set (WBSS), which is a basic service set (BSS) where devices may operate in the WAVE mode and may communicate without the need to execute the typical 802.11 authentication and association procedures. In order to discover a given WBSS, V2X devices scan multiple DSRC channels for messages from that WBSS. The WBSS will be identified by a BSSID (Base Station Subsystem Identification) in the 802.11 MAC (Media Access Control) layer frames.

The deployment of DSRC/802.11p-based Road Side Units (RSU) may involve large investments in roadway infrastructure due to coverage limitations of the 802.11p standard. Existing cellular systems, such as LTE, are being considered as an alternative to DSRC/802.11p for ITS applications given its large scale coverage and efficient spectrum utilization. The LTE Proximity Services (ProSe) functionality is being considered for enabling ITS use cases through direct device communications.

BRIEF DESCRIPTION OF THE DRAWINGS

Embodiments are illustrated by way of example, and not by way of limitation, in the figures of the accompanying drawings in which like reference numerals refer to similar elements.

FIG. 3 is a signaling flow diagram for authorizing a UE to operate as a ProSe proxy in a vehicular environment according to an embodiment.

FIG. 6 is a diagram of a protocol stack for a V2X proxy and connected other nodes in a vehicular environment according to an embodiment.

DETAILED DESCRIPTION

Figure 1:
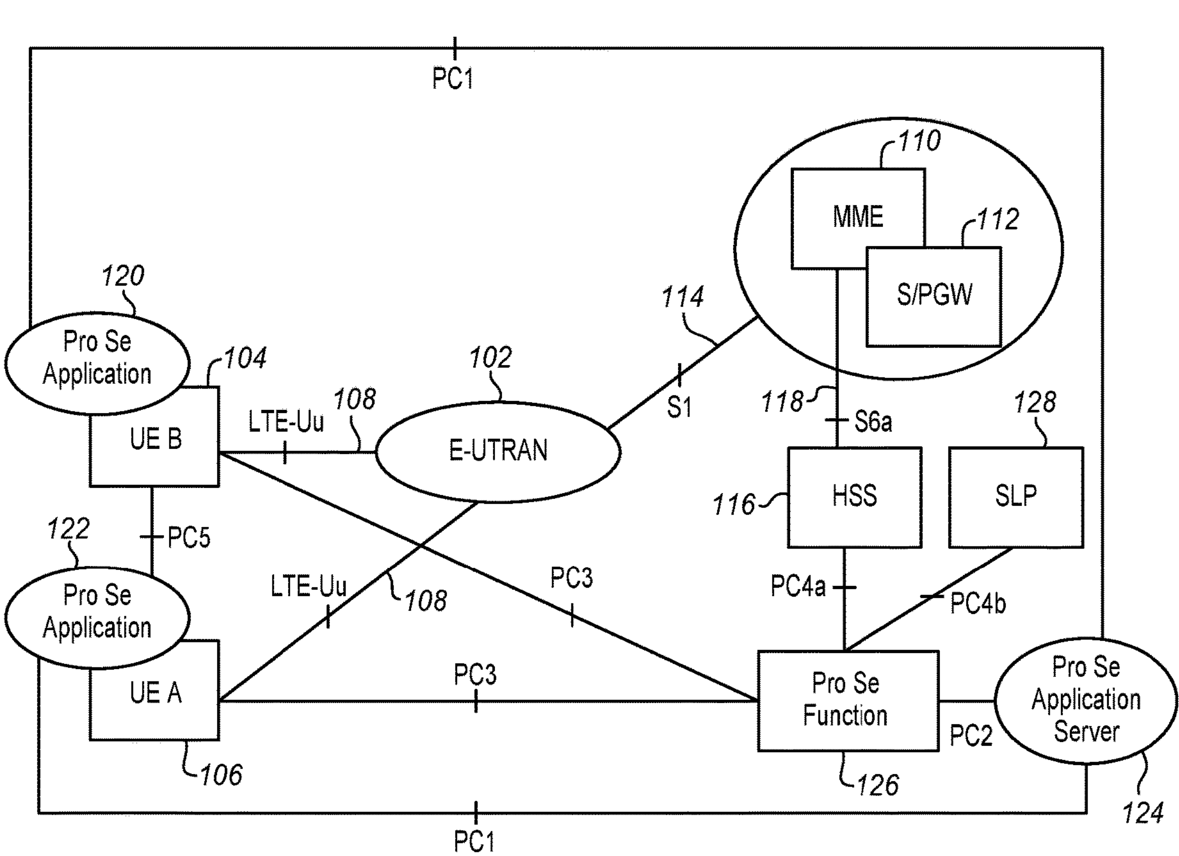
FIG. 1 is a block diagram of a portion of an LTE network in a vehicular environment with proximity services (ProSe) according to an embodiment.

Short BSM messages are useful locally to identify urgent situations (e.g. collision warning, emergency stop, pre-crash warning, etc.) within very short intervals (e.g. 20 to 100 ms). As such, minimizing the overhead involved in enabling scalable transmission and reception of BSMs will allow BSM to be sent much more quickly for V2X (V2V, V2I and V2P) over cellular systems. However, LTE ProSe protocols are not scalable and efficient to meet latency and scalability desires of V2X communications. This limits the usefulness of BSM for ITS safety applications.

Several V2X use cases described in the 3GPP V2X study group can be enabled by V2V communications only. For instance, cooperative adaptive cruise control (CACC), emergency vehicle/forward collision warning, and pre-crash sensing warning may be implemented without requirement for RSU support. Furthermore, many of these safety applications are mission critical and should continue to operate even in areas without eNB coverage.

The DSRC Implementation Guide states: "While there have been proposals for adaptive sending rate algorithms to better preserve bandwidth (especially during periods of slow moving dense traffic), at this time none is adopted in the standard and a static transmission rate of every 100 ms is used."

As adoption of V2X technology increases, the impact of V2X communications on network capacity will have to be carefully managed. The adaptation of the BSM transmissions may be used to support future mission critical safety applications with extremely low latency, such as autonomous driving, and manage spectrum resources more efficiently.

A RSU may be implemented as a standalone UE. In several scenarios, the RSU may implement additional functionality (e.g. cameras, traffic sensors, radar, etc.), which can be used to better configure the V2X operation of other UEs based on context information. For instance, a car collision risk in the middle of a traffic jam is low, while demand for user communications may increase. In this case, reducing the V2X cooperative transmission rate would reduce the load on the air interface and improve resource utilization.

In another example, a RSU in a busy intersection may have a more comprehensive view of the surrounding environment than each individual vehicle. The RSU can use its environment awareness capability to better coordinate how vehicles transmit safety messages.

Thus, there are several parameters that may be adjusted. These parameters can be adjusted by the ProSe/V2X function in the core network. However, as discussed above, communication with the core network may experience longer latency. Moreover, if a UE is outside the coverage area, it has no access to the ProSe function.

Because the ProSe Function is part of the Core Network (CN), the configuration of V2X operation parameters uses user plane communication over a PC3 interface which involves several network nodes, as described below in further detail in the context of FIG. 2. This adds to the overall overhead and latency, and may not be acceptable for safety use cases (e.g. autonomous driving, pre-crash warning, etc.). In addition when all the control of V2X operations are done through a ProSe Function, the V2X operation of UEs outside network coverage cannot be controlled.

As described herein functionalities and procedures enable control of V2X operation by authorized UEs using a PC5 interface without any requirement for direct involvement of the ProSe Function in the CN. This functionality supports an extremely low latency (e.g. 1 to 20 ms) useful for emergency and traffic control BSM. This functionality also enables V2X services outside network coverage.

A procedure is described that may be performed over the PC5 interface to enable direct UE to UE coordination of V2X operations. This may include a V2X Proxy functionality that enables a V2X UE to take control over V2X operation of other UEs without direct communication with the V2X ProSe function, where the V2X Proxy functionalities are implemented by UEs, which may also implement RSU functionalities. This may also include a protocol to enable V2X UEs to obtain authorization of the V2X ProSe function to utilize V2X Proxy functionalities. A new V2X message header may be used that includes a field announcing that the UE is operating as a V2X Proxy and is allowed to perform certain V2X configuration functions within its coverage range on behalf of the V2X ProSe Function. A further protocol may be used to enable configuration of V2X operation parameters between V2X UEs and a V2X UE operating as a V2X Proxy.

Embodiments include enhancements to the LTE ProSe function to enable more efficient direct coordination between UEs within very strict latency constraints. This may be used to support several V2I and V2V use cases. It also enables continuation of V2X services outside network coverage. In the present description a V2X UE refers to a UE that supports ProSe and V2X enabling features. The V2X ProSe Function is a ProSe function with V2X specific functionality that may be part of the ProSe function or that may be stand alone.

FIG. 1 is a diagram of a portion of an LTE network with proximity services (ProSe). The network includes an evolved universal terrestrial radio access network (E-UTRAN) 102 coupled to a first user equipment (UE), UE A 104 and a second UE, UE B 106 through an LTE air interface physical layer Uu link 108. The UEs are also able to communicate directly with each other through a PC5, WLAN (Wireless Local Area Network), Wi-Fi, or other communications link. The E-UTRAN 102 connects to a mobility management entity (MME) 110 and to a serving gateway (SGW) or packet data network (PDN) gateway (PGW) 112 through an S1 physical layer interface 114. The MME or S/PGW connects to a home subscriber server (HSS) 116 through a PC4, S6, or other physical data layer link 118.

The proximity services use a ProSe application 120, 122 at each participating UE coupled to one or more ProSe application servers 124 through a PCI or similar link. The ProSe application server delivers ProSe functions 126 to the UEs 104, 106 through a PC3 or similar link. The ProSe application servers also deliver ProSe functions to the HSS 116 and a SUPL (Secure User Plane Location) location platform (SLP) 128 through PC4 or similar links which delivers location awareness to the UEs and to any other mobile nodes in the system. The ProSe function may also connect with other services and systems to perform the described and other functions.

The LTE ProSe specification introduced new functionalities and interfaces as shown. ProSe (also referred to as direct device-to-device (D2D) communications) may allow a first user equipment (UE) to detect the presence of a second UE that is proximate to the first UE, establish a direct connection or communication session, and communicate with the second UE over the direct connection. A UE, mobile terminal, mobile communication device, etc., that is enabled for V2X communications may be referred to as a "V2X device", a "V2X UE", and the like. One of the new functionalities of the LTE ProSe specification is the EPC (Enhanced Packet Core) support for WLAN direct discovery and communication. This functionality allows the EPC network to enable two or more ProSe-enabled WLAN-capable UEs to directly communicate using WLAN technology. This decision can be taken, for example, when the EPC network supports EPC-level ProSe discovery and becomes aware that two or more UEs are in close proximity and when the EPC network knows that a first UE (UE-A) requests to communicate with a second UE (UE-B).

Figure 2:
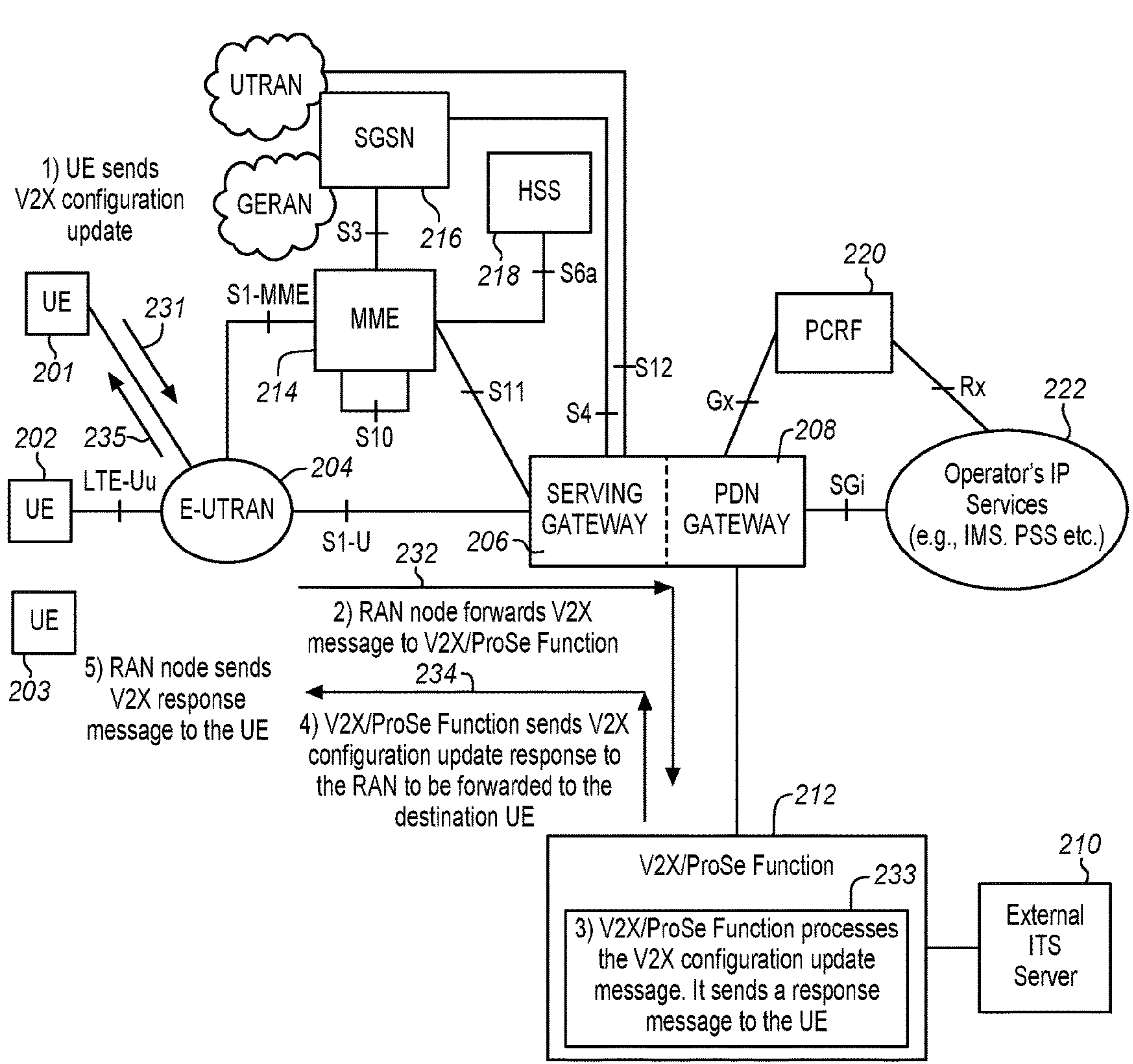
FIG. 2 is a block diagram of portion of an alternative LTE network in which a UE receives a V2X configuration update from a remote ProSe function through an E-UTRAN according to an embodiment.

FIG. 2 shows a core network (CN) in which multiple UEs 201, 202, 203 in a vehicular environment are coupled through an LTE-Uu or other wireless protocol to an E-UTRAN 204 serving as an eNB for the UE. The UEs may be vehicles, pedestrians, RSUs, infrastructure or any other UE that exchanges V2X messages operations within any wireless communication system including WAVE systems. A V2X configuration update for one of the UEs is also shown in the context of the CN. This is the configuration update that is controlled directly by a V2X ProSe Function. The E-UTRAN is coupled through S1-U or another type of link to a serving gateway 206 and a connected or integrated PDN gateway 208. The PDN gateway is coupled to a ProSe Function 212 and through SGi or a similar link to the operator's IP (Internet Protocol) services 222, for example IMS, PSS, etc. A policy and charging rules function (PCRF) 220 may be linked to the PDN gateway with a Gx connection and to the Operator's IP services with a Rx function and to other components of the core network as desired. Additional ITS servers 510 are coupled directly or indirectly to the V2X ProSe Function. In this example the servers are external servers but the location of the servers may be adapted to suit different network structures and implementations. The V2X ProSe Function may access other servers to validate credentials and to obtain any other system or customer information.

The E-UTRAN is further coupled to an MME through S1-MME which may also be coupled to the serving gateway through S11. The MME provides connections to a variety of different functions and systems that may be integrated into the MME or provided separately. These may include a home subscriber server (HSS) 218, a serving GPRS (general packet radio service) support node (SGSN) 216 as well as UTRAN and GSM (Global System for Mobile communications) EDGE (Enhanced Data Rated for GSM Evolution) radio access network (GERAN) and any other desired services.

In this case, the V2X configuration update procedure is shown as being carried out between one of the V2X UEs 201 through the eNB 204. The UE begins this transaction procedure by sending a V2X configuration update 231 to the V2X ProSe function 212 through the local eNB 204, in this case an E-UTRAN. The radio access node (RAN) 204 forwards 232 the V2X message to the V2X ProSe function 212. At the V2X ProSe function, the V2X configuration update message is processes 233. This may include checking credentials, determining configuration parameters for the WBSS, and other functions. These functions may access the external ITS servers 210. When finished, the V2X ProSe function sends 234, a V2X configuration update response back to the RAN 204 to be forwarded to the destination UE 201. The RAN, then sends 235 the V2X response message to the UE. At this stage the UE is able to apply the configuration information in the response message 235. The configuration information may be the same as or different from the configuration information in the original request message 231.

In order to enable efficient distributed coordination between UEs, while following rules and policies set by the V2X ProSe function, a V2X Proxy may be used. A V2X Proxy as described herein enables UEs after having been authorized by the V2X ProSe function to control the configuration information (e.g. V2X operation mode and cooperative message transmission rate) of other UEs. The V2X Proxy acts under authorization and supervision of a V2X ProSe function, but eliminates much of the overhead for coordination with the ProSe function over the PC3 interface as shown in FIG. 2. Once authorized, the V2X Proxy can react faster to other UEs than the ProSe function can. As a result, the V2X Proxy helps to ensure that mission critical deadlines are met.

In one embodiment, UEs implementing RSU functions may operate as a V2X Proxy and control the V2X mode and cooperative messages (BSM) transmission rates of other UEs under its coverage. In other words some UEs may receive an authorization from the ProSe Function to communicate directly with other UEs to control the local V2X configuration information. Multiple V2X proxies may be established to allow configuration update responses to be sent even faster and to more UEs at the same time.

A V2X UE may be pre-configured with information to operate as V2X Proxy, which is sent to the V2X ProSe Function during initial service authorization. The V2X ProSe function has the responsibility to verify the credentials and authorize the UE to operate as a V2X Proxy. Optionally, the Proxy capability of the V2X UE may be part of the UE subscription.

In another embodiment, the V2X UE can also send a request to the V2X ProSe function to operate as a V2X Proxy at any time after configuration and initialization. The ProSe function may use the UEs V2X credentials and consult external servers (e.g. geolocation and ITS servers) to decide whether the UE should be allowed to operate as a V2X Proxy. An example embodiment of a V2X Proxy registration procedure is described in the context of FIG. 3.

FIG. 3 is a signaling flow diagram for obtaining a proxy operation authorization for a UE from a ProSe Function. At 310 a V2X UE, which may be any UE within range of a vehicular environment communication group for WAVE or another system, sends a registration request 310 to a V2X ProSe function 304 to operate as a V2X proxy for the ProSe function. The request may be made through any one of a variety of different wireless connections available to the UE including the cellular D2D (Device to Device) interface (e.g. LTE PC5, 5G D2D), and a WLAN interface. Any interface for direct communication could be used, e.g. WLAN, WPAN, or Cellular D2D. In the example, the ProSe Function is divided into three different nodes which may be in different locations that are connected through any of a variety of different links. Alternatively any two or all of these nodes may be combined into a single unit or may be physically located in the same place whether in nearby hardware structures, on the same rack, or in the same chassis. The first node is a V2X ProSe Function 304 at the home PLMN (Public Land Mobile Network). The second ProSe Function node 306 is at a visitor or local PLMN and the third node is external ITS servers 308, which as mentioned above may be co-located with one or the other PLMN's.

After receiving a proxy request 310 from the V2X UE, the receiving V2X ProSe Function 304 then attempts to determine whether the requesting V2X UE is authorized to receive a proxy. This may be done by sending a request 312 from the home PLMN 304 to the visitor or local PLMN 306 to obtain authorization information. If available, then the local PLMN 306 sends 314 an authorization response back to the home PLMN. The home PLMN may also or alternatively request 318 authorization from external ITS servers 308. If available, then the external ITS servers may send 320 an authorization response. All of these requests and responses for authorization may contain V2X configuration information that the proxy UE may use to update V2X configurations of other UEs. If the V2X UE 302 is authorized to act as a proxy for the ProSe Function 304, then the ProSe Function at the home PLMN may send a response 322 which includes the authorization and the authorized V2X proxy configuration.

The V2X UE after receiving the authorization may send an acknowledgment back to the ProSe Function at the home PLMN 304. The ProSe Function at the home PLMN may also send notifications to the ITS servers 308 and any other appropriate entities that the UE has registered with the ProSe Function and has received a proxy authorization response.

In one embodiment, in addition to the V2X UE's identification and security related credentials, a V2X Proxy registration request may also include a V2X Proxy configuration request. An example of such a request is shown in Table 1. More or fewer fields may be used to suit different implementations. The V2X ProSe Function sends back the final V2X Proxy configuration to be used by the UE.

TABLE 1

| Field | Description |
|---|---|
| PSID(s) (Provider Service Identifier(s)) | One or more PSID values over which the UE is requesting to take operational control as a proxy. |
| Control_Area_Coordinates | Geolocation information determining the specific area covered by the UE that is requesting V2X Proxy capabilities. |
| Out of coverage enabled | Whether the proxy is authorized to operate outside of network coverage. The V2X ProSe function may decide to authorize the Proxy within or outside the network coverage. |
| Validity | Time interval during which the V2X UE will operate as a V2X Proxy. The V2X ProSe function may decide to authorize the Proxy operation for a fixed time duration. For instance, a V2X UE in an emergency vehicle may operate as an RSU Proxy only during emergency situations. |

A V2X proxy header may be used by a UE proxy to indicate its status as a proxy. If authorized, a V2X UE may include the V2X Proxy header in messages sent over a PC5 interface, and set an X bit in the Proxy header to advertise its status as an authorized V2X Proxy.

Figure 4:
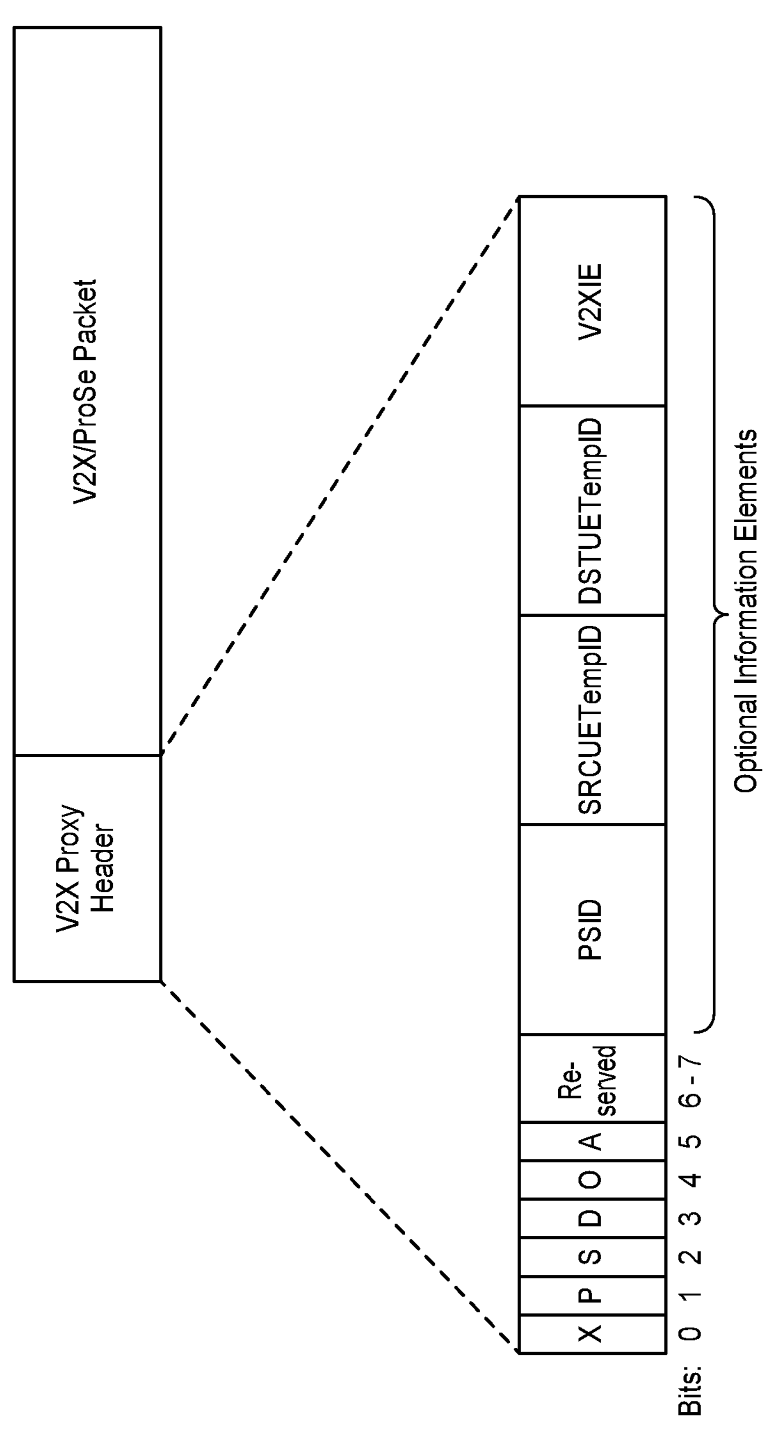
FIG. 4 is a diagram of a ProSe proxy packet header for use by a UE according to an embodiment.

An example of a V2X Proxy header is shown in FIG. 4. It includes fixed (e.g., mandatory) and variable (e.g., optional) parts. The initial 6 bits (bits 0-5) of the first byte indicate which optional information element is included. The optional fields (bits 6-7) may be used when a specific coordination action is invoked. After the first 8 bits, the header may include a sequence of optional information elements such as provider, source, destination, and V2X operation mode identifiers. The header may then be followed by a V2X ProSe Packet. The V2X Proxy header fields of FIG. 4 are described in more detail in Table 2. The particular number of bits may be modified to suit different implementations. Additional fields may be added and some of the fields shown may be deleted to suit different implementations. The example header of Table 2 has several specific rules which may be modified to suit different implementations.

TABLE 2

| Field | Size (bits) | Description |
|---|---|---|
| X | 1 | If set to one, indicates the message is transmitted by a V2X Proxy. UEs operating as a V2X Proxy may always set this field to one. Other UEs may set it to zero. |
| P (Provider) | 1 | If set to one, indicates the header includes an application service identifier (e.g. PSID). Only a V2X Proxy may set this field to one. Other UEs may set it to zero. |
| S (Source) | 1 | If set to one, indicates the header includes a SRCUEtempID field. |
| D (Destination) | 1 | If set to one, indicates the header includes a DSTUEtempID field. |
| O (Operation) | 1 | If set to one, indicates the header includes a V2X operation information element (IE). Only a V2X Proxy may set this field to one. Other UEs may set it to zero. |
| A (Acknowledge) | 1 | If set to one, indicates an acknowledgment to an open transaction. The UE includes its UETempID in the packet if this bit is set to 1. This field can be used to send acknowledgment to other UEs (e.g. UE can acknowledge a configuration update received from the V2X Proxy). |
| 6-7 | 2 | Reserved for future use. |
| PSID (Provider Service ID) | TBD | Identifier of an application service that the V2X Proxy is authorized to configure. |
| SRCUETempID (Source UE Temporary ID) | 32 | V2X UE address of the UE generating the message. |
| DSTUETempID (Destination UE Temporary ID) | 32 | Destination address of the V2X UE. Field may not be included if message is a broadcast. |
| V2XIE (V2X IE) | TBD | Includes information to identify the V2X operation mode, the rate at which UEs are expected to transmit safety messages and the duration for which the configuration information in the IE may be valid. |

V2X Proxy after being authorised may send advertisements within the network coverage area and, if authorised, then it may also send advertisements outside of the network coverage area. Using the header preamble above, the V2X UE authorized to operate as a V2X Proxy sets the X bit in the V2X Proxy header of V2X messages sent over a PC5 interface. It may also include other Information Elements as desired. The V2X Proxy may also set the P bit in the V2X Proxy header to indicate that it supports the service(s) described in the PSID field.

V2X UEs are able to discover a UE, RSU or other component acting as a V2X Proxy by monitoring the X bit in the V2X messages. They may further verify whether they can use the V2X Proxy services by comparing the PSID(s) in the received messages with the PSID(s) that they support.

If a V2X ProSe registered V2X UEs loses network coverage, it can still operate in V2X mode if it detects a V2X Proxy. The V2X UE may operate using PC5 links even without the LTE-Uu links. If an out of coverage V2X UE does not receive any V2X messages with the X bit set for a given time interval (the UE may be configured with an out of coverage timeout parameter that may be pre-configured or set by the service provider), it may suspend its V2X operation until it discovers another V2V proxy, re-enters network coverage, or becomes a V2X Proxy itself, if the UE is pre-authorized to operate as a V2X Proxy.

Figure 5:
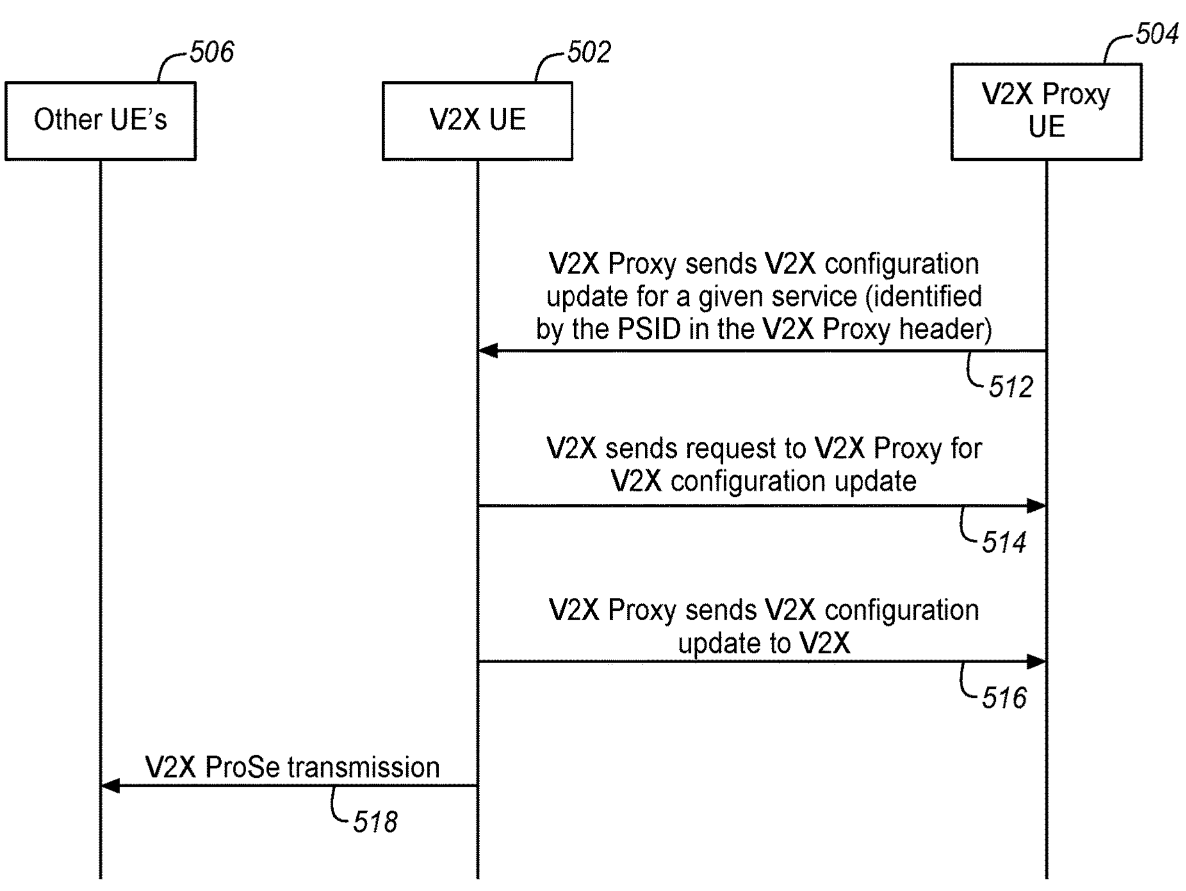
FIG. 5 is a signaling flow diagram for updating a V2X configuration of a UE according to an embodiment.

FIG. 5 is a signaling flow diagram of updating configuration of a V2X UE 502 using a V2X proxy 504. A V2X Proxy 504 may transmit V2X messages 512 with the V2X IE to re-configure the V2X operation mode of other UEs 502 within its coverage area and supporting the same services, which can be identified by the PSID(s). V2X UEs receiving the V2X IE and supporting the PSID announced by the V2X Proxy may decode the V2X IE and adapt operation based on the parameters included in the V2X IE. Once a V2X UE detects the presence of a V2X Proxy within its coverage range, the UE may request 514 the V2X Proxy to update its V2X operation parameters. In this case, the UE may include the V2X Proxy address as the destination address (DSTUE_tempID) and include the requested operational parameters in a V2X IE, as well as the PSID(s) to which the request applies.

If the V2X Proxy authorizes the new requested configuration, it responds with a configuration update 516 confirming (or adapting) the V2X operational parameters. The V2X UE can confirm the reception of the re-configuration information by setting the A bit in the header of its next V2X ProSe transmission 518. This transmission may be BSM or any other type of allowed V2X message. This transmission may also be received by the proxy UE if it is a BSM or other broadcast.

FIG. 6 is a diagram of an example protocol stack for a V2X proxy UE. In the illustrated embodiment, the UE uses a PC5 interface for direct communication with the V2X Proxy UE. As a result, none of the core network resources are required. Neither the eNB nor any MME or gateway services are required to update the UE configuration. This is not only faster, but more reliable than the process shown in FIG. 2.

As shown, the V2X Proxy UE may have an ITS application, and can choose to send the messages received to the ITS application or forward the messages to an eNB, to be sent to the ProSe/V2X function in the core network. This may be done after the configuration update of the UE so that the UE configuration is not delayed by any network messaging. This decision can be done based on the message type or some indication in the MAC header of the requesting UE.

A V2X Proxy UE may include the V2X Proxy capability indication as part of the "UE Network Capability" in the Attach Request and/or Tracking Area Update Request message. The MME stores this information for ProSe/V2X operation.

If the V2X Proxy UE is capable of providing Proxy services based on UE subscription, the MME may include a Proxy authorization indication in the S1 AP Initial Context Setup Request. Note that the UE may still get authorization from the ProSe function in order to operate in Proxy mode.

Figure 7:
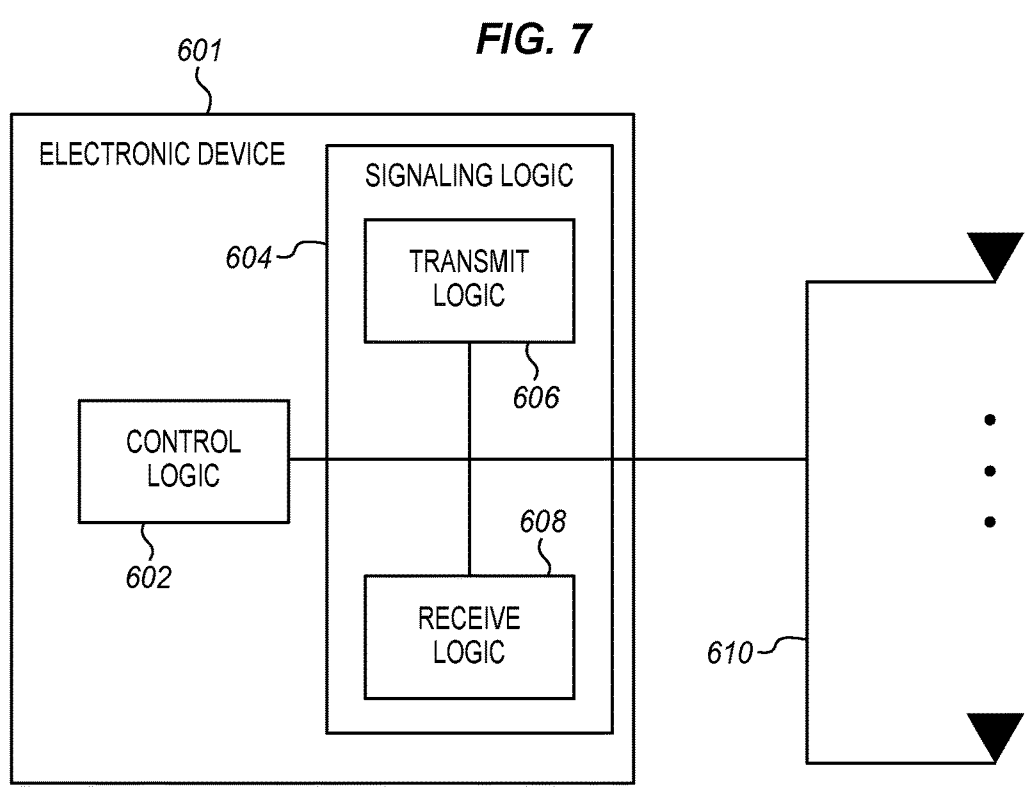
FIG. 7 is a block diagram of a core network device according to an embodiment.

FIG. 7 is a block diagram that illustrates an electronic device 601 that may be, or may be incorporated into or otherwise part of, an eNB, a MME, a V2X UE, an electronic device implementing a V2X ProSe function, and/or any other type of network element or other like electronic device in accordance with various embodiments. Specifically, the electronic device may be logic and/or circuitry that may be at least partially implemented in one or more of hardware, software, and/or firmware.

In embodiments, the electronic device logic may include signaling logic 604, which may include radio transmit logic 606 and receive logic 608 coupled to control logic 602. In embodiments, the transmit and/or receive logic may be elements or modules of transceiver logic, as shown 604. The electronic device may be coupled with or include one or more plurality of antenna elements of one or more antennas 610.

The electronic device and/or the components of the electronic device may be configured to perform operations similar to those described elsewhere in this disclosure. In embodiments where the electronic device is a V2X UE, or is implemented into or otherwise part of a V2X UE, the control logic may be to identify a V2X proximity services (ProSe) function. The transmit logic may be to transmit, to the ProSe function, a request for the V2X UE to operate as a V2X proxy.

In some embodiments, the control logic may be to implement a vehicle to anything (V2X) proximity services (ProSe) function. The receive logic may be to receive, from a V2X user equipment (UE), a request for the V2X UE to operate as a V2X proxy in which the V2X UE is able to control V2X operation of one or more other V2X UEs. The transmit logic may be to transmit, in response to the request, an authorization to the V2X UE to operate as a V2X proxy.

In embodiments where the electronic device is implemented in an eNB or a core network (CN) element, the control logic may authorize registration of a WBSS service for a user UE. To authorize registration of the WBSS service for the UE, the control logic may authenticate credentials associated with the UE with a serving network of the UE and/or one or more external ITS servers. In such embodiments, the signaling logic may provide a registration response to the UE. The registration response may include an indication as to whether the UE has been authorized for the WBSS services.

In embodiments where the electronic device is implemented in an eNB, the signaling logic may receive a registration request message from a UE over a LTE-Uu interface. Further, in embodiments where the electronic device is implemented in an eNB, the control logic may include a ProSe authorised indication or a V2X authorized indication in an X2-application protocol (AP) Handover Request message during X2-based handover procedure. The ProSe authorized indication may indicate that the UE is authorized to use ProSe and the V2X authorized indication may indicate that the UE is authorized to use WBSS services and/or wireless local area network (WLAN) direct services.

In embodiments where the electronic device is implemented in a CN element, the CN element may be communicatively coupled via an interface with a serving gateway (SGW) or a packet data network (PDN) gateway (PGW). Furthermore, when the electronic device is implemented in an MME, the signaling logic may receive a message including a capability indication. In such embodiments, the control logic may store the capability indication, and provide the capability information to authorize capabilities indicated by the capability information.

Figure 8:
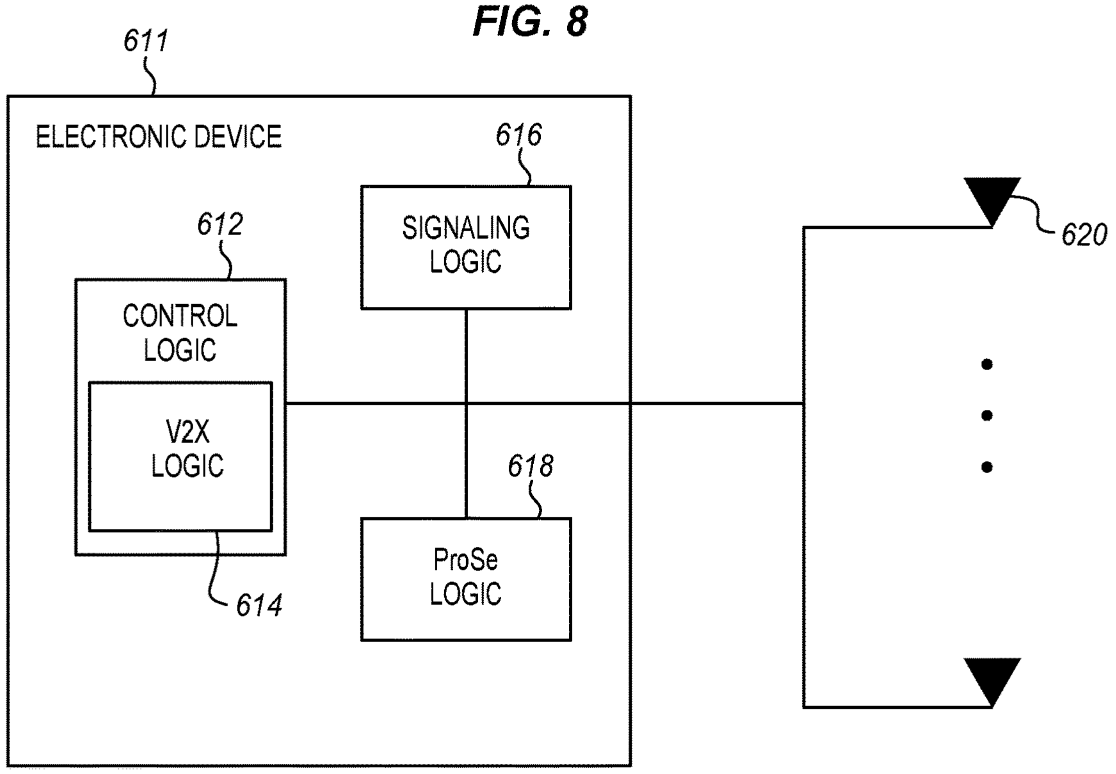
FIG. 8 is a block diagram of a UE or mobile device according to an embodiment.

FIG. 8 is a block diagram that illustrates an electronic device that may be, or may be incorporated into or otherwise part of, a UE, a mobile device, a V2X UE, an electronic device implementing a V2X ProSe function, and/or any other type of electronic device in accordance with various embodiments. Specifically, the electronic device may be logic and/or circuitry that may be at least partially implemented in one or more of hardware, software, and/or firmware. In embodiments, the electronic device logic may include signaling logic 616, which may include radio transmit logic and receive logic (not shown); coupled with ProSe logic 618, which may also include radio transmit logic and receive logic (not shown); each of which are coupled to control logic 612, which may include V2X logic 614. The transmit logic and/or the receive logic included with the signaling logic and/or the ProSe logic may be the same or similar to the transmit logic and/or the receive logic discussed previously with regard to FIG. 6.

In embodiments, the signaling logic and/or the ProSe logic may be elements or modules of transceiver logic and the like. The electronic device may be coupled with or include one or more plurality of antenna elements of one or more antennas 620. The electronic device and/or the components of the electronic device may be configured to perform operations similar to those described elsewhere in this disclosure. For example, in embodiments where the electronic device is implemented in a UE, the V2X logic may generate a registration request message to be sent to a ProSe Function. The signaling logic may provide the registration request message to the ProSe Function, and the ProSe logic may provide a direct communications session over a DSRC channel when the ProSe Function indicates that the UE is authorized to provide the direct communications session.

As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Specifically, the logic may at be at least partially implemented in, or an element of, hardware, software, and/or firmware. In some embodiments, the electronic device logic may be implemented in, or functions associated with the logic may be implemented by, one or more software or firmware modules.

Figure 9:
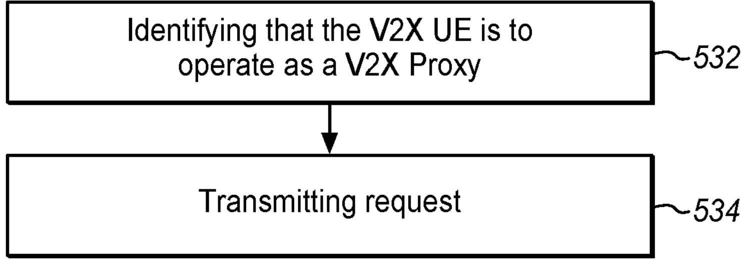
FIG. 9 is a process flow diagram for requesting a V2X configuration update according to an embodiment.

In some embodiments, the electronic device of FIG. 7 or 8 may be configured to perform one or more processes such as the process of FIG. 9. For example, in embodiments where the electronic device is a V2X UE, or is incorporated into or otherwise part of a V2X UE, the process may include identifying 532, by a vehicle to anything (V2X) user equipment (UE), that the V2X UE is to operate as a V2X proxy. The process may further include transmitting 534, by the V2X UE to a proximity services (ProSe) function, a request for the V2X UE to operate as the V2X proxy.

Figure 10:
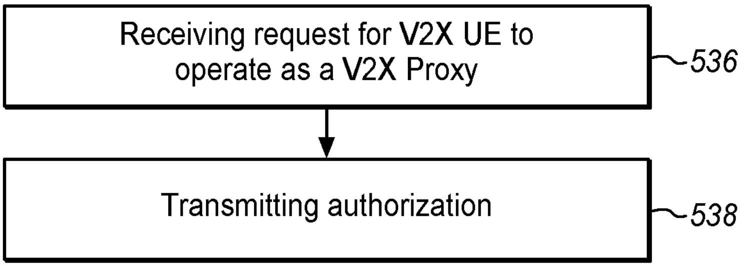
FIG. 10 is a process flow diagram for authorizing a V2X UE to operate as a V2X proxy according to an embodiment.

In some embodiments, the electronic device of FIG. 7 or 8 may be configured to perform one or more processes such as the process of FIG. 10. For example, in embodiments where the electronic device is to implement a V2X ProSe function, the process may include receiving 536, by a V2X proximity services (ProSe) function from a V2X user equipment (UE), a request for the V2X UE to operate as a V2X proxy in which the V2X UE is able to control V2X operation of one or more other V2X UEs. The process may further include transmitting 538, by the V2X ProSe function in response to the request, an authorization to the V2X UE to operate as a V2X proxy.

Figure 11:
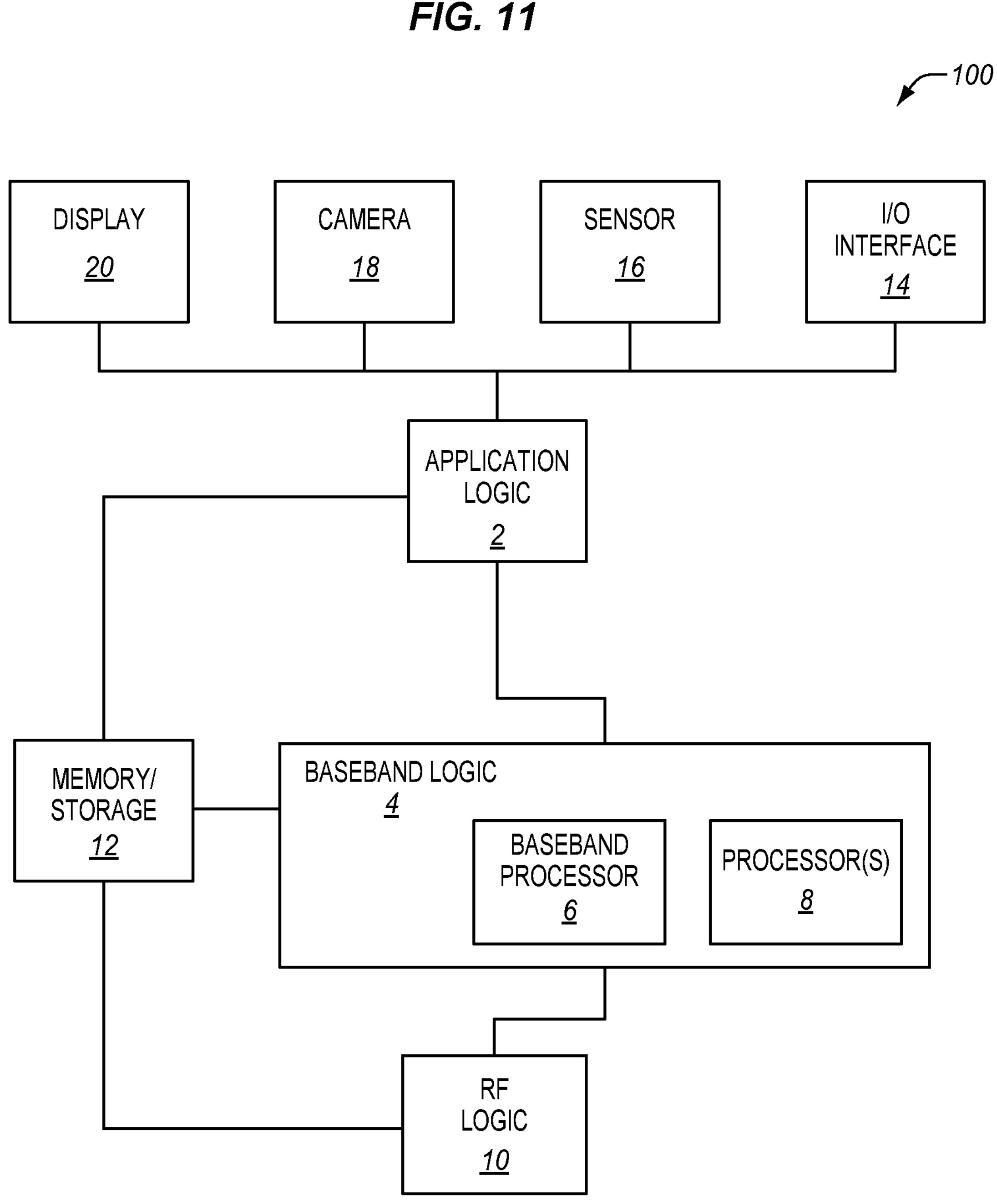
FIG. 11 is a block diagram of an example computing system according to an embodiment.

Embodiments described herein may be implemented into a system using any suitably configured hardware and/or software. FIG. 11 is a block diagram that illustrates, for one embodiment, an example system 100 comprising radio frequency (RF) logic 10, baseband logic 4, application logic 2, memory/storage 12, display 20, camera 18, sensor 16, and input/output (I/O) interface 14, coupled with each other at least as shown.

The application logic 2 may include one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband logic 4 may include one or more single-core or multi-core processors. The processor(s) may include a baseband processor 6 and/or additional or alternative processors 8 that may be designed to implement functions or actions of the control logic, transmit logic, and/or receive logic described elsewhere herein.

The baseband logic may handle various radio control functions that enable communication with one or more radio networks via the RF logic 10. The radio control functions may include, but are not limited to, signal modulation, encoding, decoding, radio frequency shifting, etc. In some embodiments, the baseband logic may provide for communication compatible with one or more radio technologies. For example, in some embodiments, the baseband logic may support communication with an evolved universal terrestrial radio access network (EUTRAN) and/or other wireless metropolitan area networks (WMAN), a wireless local area network (WLAN), a wireless personal area network (WPAN). Embodiments in which the baseband logic is configured to support radio communications of more than one wireless protocol may be referred to as multi-mode baseband logic.

In various embodiments, baseband logic may include logic to operate with signals that are not strictly considered as being in a baseband frequency. For example, in some embodiments, baseband logic may include logic to operate with signals having an intermediate frequency, which is between a baseband frequency and a radio frequency.

RF logic 10 may enable communication with wireless networks using modulated electromagnetic radiation through a non-solid medium. In various embodiments, the RF logic may include switches, filters, amplifiers, etc. to facilitate the communication with the wireless network. In various embodiments, RF logic may include logic to operate with signals that are not strictly considered as being in a radio frequency. For example, in some embodiments, RF logic may include logic to operate with signals having an intermediate frequency, which is between a baseband frequency and a radio frequency.

In various embodiments, transmit logic, control logic, and/or receive logic discussed or described herein may be embodied in whole or in part in one or more of the RF logic 10, the baseband logic 4, and/or the application logic 2. It should be noted that the various logic types disclosed previously may be combined or separated into different logic types and/or referred to as different logic types. For example, in some embodiments, the baseband logic may be combined with the RF logic to operate as signaling logic, communications logic, and the like.

By way of another example, in some embodiments, the baseband logic, the baseband processor, and/or any other like processing device may be referred to a "processing logic," "control logic," and the like. As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Specifically, the logic may at be at least partially implemented in, or an element of, hardware, software, and/or firmware. In some embodiments, the electronic device logic may be implemented in, or functions associated with the logic may be implemented by, one or more software or firmware modules.

In some embodiments, some or all of the constituent components of the baseband logic, the application logic, and/or the memory/storage may be implemented together on a system on a chip (SOC).

Memory/storage 12 may be used to load and store data and/or instructions, for example, for system 100. Memory/storage for one embodiment may include any combination of suitable volatile memory (e.g., dynamic random access memory (DRAM)) and/or non-volatile memory (e.g., Flash memory).

In various embodiments, the I/O interface 14 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 16 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband logic and/or RF logic to communicate with components of a positioning network, e.g., a global positioning system (GPS) satellite.

The sensor and the camera in a vehicular environment may be configured to provide situational awareness for a vehicle and any other connected devices. There may be many different camera in different positions and sensor of different types such as laser, sonar, infrared, radar and environmental sensors. The camera and sensors may be coupled to various vehicle safety and autonomy systems such as cooperative adaptive cruise control (CACC), emergency vehicle/forward collision warning, and pre-crash sensing warnings. The camera and sensor may be able to detect any of a variety of different safety conditions and provide these to the application logic for safety applications related to safety services and safety messages.

In various embodiments, the display 20 may include a display (e.g., a liquid crystal display, a touch screen display, etc.).

In various embodiments, the system may be a mobile computing device such as, but not limited to, a laptop computing device, a tablet computing device, a netbook, an ultrabook, a smartphone, etc. In various embodiments, system may have more or less components, and/or different architectures.

In various embodiments, the system may be a mobile computing device such as, but not limited to, a laptop computing device, a tablet computing device, a netbook, an ultrabook, a smartphone, a vehicular communication system or device, an in-vehicle infotainment (IVI) system or device, an in-car entertainment (ICE) system or device, a driver monitoring system or device, a driver attention monitoring device or system, an in-vehicle monitoring system or device, etc. In various embodiments, system may have more or less components, and/or different architectures. For example, in some embodiments the RF logic and/or the baseband logic may be embodied in communication logic (not shown).

The communication logic may include one or more single-core or multi-core processors and logic circuits to provide signal processing techniques, for example, encoding, modulation, filtering, converting, amplifying, etc., suitable to the appropriate communication interface over which communications will take place. The communication logic may communicate over wireline, optical, or wireless communication mediums. In embodiments in which the system is configured for wireless communication, the communication logic may include the RF logic and/or baseband logic to provide for communication compatible with one or more radio technologies. For example, in some embodiments, the communication logic may support communication with an evolved universal terrestrial radio access network (EU-TRAN) and/or other wireless metropolitan area networks (WMAN), a wireless local area network (WLAN), a wireless personal area network (WPAN).

Embodiments of the technology herein may be described as related to the third generation partnership project (3GPP) long term evolution (LTE) or LTE-advanced (LTE-A) standards. For example, terms or entities such as eNodeB (eNB), mobility management entity (MME), user equipment (UE), etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (Wi-Fi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

The detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the described embodiments. However, it will be apparent to those skilled in the art having the benefit of the present disclosure that the various aspects of the claimed embodiments may be practiced in other examples that depart from these specific details. In certain instances, descriptions of well-known devices, circuits, and methods are omitted so as not to obscure the description of the present embodiment with unnecessary detail.

EXAMPLES

Example 1 may include a system including V2X UEs, one or more V2X ProSe functions and external servers, in which a V2X UE sends a request to the ProSe function to operate as a V2X Proxy;

Example 2 may include the system of example 1 or some other example herein, in which V2X UEs operating as V2X Proxy are able to control the V2X operation configuration of other V2X UEs;

Example 3 may include the system of example 1 or some other example herein, in which the V2X UE includes its Proxy configuration parameters in the request sent to the V2X ProSe function including supported services identifiers (PSID), coverage area and whether the UE can operate out of coverage;

Example 4 may include the system of example 1 or some other example herein, in which the V2X ProSe function may forward the Proxy request to other V2X ProSe Functions and/or external servers in order to get authorization for enabling the V2X UE to operate as a V2X Proxy;

Example 5 may include the system of example 1 or some other example herein, in which the V2X ProSe function is a V2X specific functionality that is implemented as part of the ProSe function;

Example 6 may include the system of example 1 or some other example herein, in which the V2X ProSe function is a V2X specific functionality that is implemented as a standalone function;

Example 7 may include the system of example 1 or some other example herein, in which the V2X ProSe function sends a response to the V2X UE including the authorization and V2X Proxy configuration that the UE is allowed to use in order to operate as a V2X Proxy, which includes the coverage area, the out of coverage authorization and the validity.

Example 8 may include the system of example 1 or some other example herein, in which a V2X Proxy announces its capability by setting a proxy field (P) in V2X messages transmitted over the PC5 interface;

Example 9 may include the system of example 1 or some other example herein, in which a V2X Proxy may use a combination of location, service subscription and higher layer context information to decide where and when to update V2X Operation of one or more UEs by including the V2X Proxy header in its V2X messages containing the V2X operation information.

Example 10 may include the system of example 1 or some other example herein, where V2X UEs that are capable and authorized to implement configuration updates from the V2X Proxy assistance use V2X operation information in the announcement message to update their configuration accordingly;

Example 11 may include the system of example 1 or some other example herein, in which V2X UEs may request a V2X Proxy to update its V2X operation configuration;

Example 12 may include the system of example 1 or some other example herein, in which the V2X Proxy may authorize the UE request to update its V2X configuration and sends back a response with the approved configuration to be used;

Example 13 may include the system of example 1 or some other example herein, in which V2X UEs and V2X Proxy exchange V2X messages and/or one or more basic safety messages (BSMs) while outside network coverage.

Example 14 may include the system of example 1 or some other example herein, in which the V2X Proxy implements both PC5 and user-plane interfaces;

Example 15 may include the system of example 1 or some other example herein, in which V2X UEs may include the V2X Proxy capability indication as part of the "UE Network Capability" in the Attach Request and/or Tracking Area Update Request message.

Example 16 may include the system of example 1 or some other example herein, in which the MME may include a Proxy authorization indication in the S1 AP Initial Context Setup Request, also indicating whether the UE is capable of supporting V2X Proxy services.

Example 17 may include a vehicle to anything (V2X) user equipment (UE) comprising: control logic to: identify a V2X proximity services (ProSe) function; and transmit logic coupled with the control logic, the transmit logic to transmit, to the ProSe function, a request for the V2X UE to operate as a V2X proxy.

Example 18 may include the V2X UE of example 17 or some other example herein, wherein the control logic is to control V2X operation configuration(s) of one or more other V2X UEs when the V2X UE is a V2X proxy.

Example 19 may include the V2X UE of example 17 or some other example herein, wherein the request includes one or more of: an indication of one or more proxy configuration parameters of the V2X UE, an indication of one or more supported services identifiers (PSIDs), an indication of coverage area, and/or an indication of whether the V2X UE can operate out of the coverage area.

Example 20 may include the V2X UE of example 17 or some other example herein, further comprising receive logic coupled with the transmit logic, the receive logic to receive, from the V2X ProSe function, an authorization related to the request, wherein the authorization includes an indication of a V2X Proxy configuration, a coverage area, an out of coverage authorization and/or validity.

Example 21 may include the V2X UE of example 17 or some other example herein, wherein the transmit logic is further to transmit a capability announcement that includes a proxy field (P) in one or more V2X messages transmitted over a PC5 interface.

Example 22 may include the V2X UE of example 17 or some other example herein, wherein the control logic is to use a combination of location, service subscription and higher layer context information decide where and when to update V2X Operation of one or more UEs by including the V2X Proxy head in its V2X messages containing the V2X operation information.

Example 23 may include the V2X UE of example 22 or some other example herein, where V2X UEs that are capable and authorized to implement configuration updates from the V2X Proxy assistance use V2X operation information in the announcement message to update their configuration accordingly;

Example 24 may include the V2X UE of example 17 or some other example herein, further comprising receive logic coupled with the control logic, the receive logic to receive, from one or more other V2X UEs, a request for the V2X UE to update its V2X operation configuration.

Example 25 may include the V2X UE of example 24 or some other example herein, wherein the transmit logic is further to transmit, based on the request, an authorization that includes an approved configuration.

Example 26 may include the V2X UE of example 17 or some other example herein, in which the V2X UE is to exchange, via the transmit logic and/or receive logic coupled with the transmit logic, one or more V2X messages and/or one or more basic safety messages (BSMs) with another UE while outside network coverage.

Example 27 may include the V2X UE of example 17 or some other example herein, in which the control logic, transmit logic and/or receive logic are to implement both PC5 and user-plane interfaces.

Example 28 may include the V2X UE of example 17 or some other example herein, in which one or more UEs with which the V2X UE is communicatively coupled are to include a V2X Proxy capability indication as part of a "UE Network Capability" indication in an Attach Request and/or Tracking Area Update Request message.

Example 29 may include the V2X UE of example 17 or some other example herein, further comprising receive logic coupled with the transmit logic, the receive logic to receive, from a mobility management entity (MME), a Proxy authorization indication in a S1 AP Initial Context Setup Request, also indicating whether the V2X UE is capable of supporting V2X Proxy services.

Example 30 may include a method comprising: identifying, by a vehicle to anything (V2X) user equipment (UE), that the V2X UE is to operate as a V2X proxy; and transmitting, by the V2X UE to a proximity services (ProSe) function, a request for the V2X UE to operate as the V2X proxy.

Example 31 may include the method of example 30 or some other example herein, further comprising controlling, by the V2X UE, V2X operation configuration(s) of one or more other V2X UEs when the V2X UE is a V2X proxy.

Example 32 may include the method of example 30 or some other example herein, wherein the request includes one or more of: an indication of one or more proxy configuration parameters of the V2X UE, an indication of one or more supported services identifiers (PSIDs), an indication of coverage area, and/or an indication of whether the V2X UE can operate out of the coverage area.

Example 33 may include the method of example 30 or some other example herein, further comprising receiving, by the V2X UE from the V2X ProSe function, an authorization related to the request, wherein the authorization includes an indication of a V2X Proxy configuration, a coverage area, an out of coverage authorization and/or validity.

Example 34 may include the method of example 30 or some other example herein, further comprising transmitting, by the V2X UE, a capability announcement that includes a proxy field (P) in one or more V2X messages transmitted over a PC5 interface.

Example 35 may include the method of example 30 or some other example herein, wherein the V2X UE is to use a combination of location, service subscription and higher layer context information decide where and when to update V2X Operation of one or more UEs by including the V2X Proxy header in its V2X messages containing the V2X operation information.

Example 36 may include the method of example 35 or some other example herein, where V2X UEs that are capable and authorized to implement configuration updates from the V2X Proxy assistance use V2X operation information in the announcement message to update their configuration accordingly;

Example 37 may include the method of example 30 or some other example herein, further comprising receiving, by the V2X UE from one or more other V2X UEs, a request for the V2X UE to update its V2X operation configuration.

Example 38 may include the method of example 37 or some other example herein, further comprising transmitting, by the V2X UE based on the request, an authorization that includes an approved configuration.

Example 39 may include the method of example 30 or some other example herein, further comprising exchanging, by the V2X UE, one or more V2X messages and/or one or more basic safety messages (BSMs) with another UE while outside network coverage.

Example 40 may include the method of example 30 or some other example herein, in which the V2X UE is to implement both PC5 and user-plane interfaces.

Example 41 may include the method of example 30 or some other example herein, in which one or more UEs with which the V2X UE is communicatively coupled are to include a V2X Proxy capability indication as part of a "UE Network Capability" indication in an Attach Request and/or Tracking Area Update Request message.

Example 42 may include the method of example 30 or some other example herein, further comprising receiving, by the V2X UE, from a mobility management entity (MME), a Proxy authorization indication in a S1 AP Initial Context Setup Request, also indicating whether the V2X UE is capable of supporting V2X Proxy services.

Example 43 may include an electronic device comprising: control logic to implement a vehicle to anything (V2X) proximity services (ProSe) function; receive logic coupled with the control logic, the receive logic to receive, from a V2X user equipment (UE), a request for the V2X UE to operate as a V2X proxy in which the V2X UE is able to control V2X operation of one or more other V2X UEs; and transmit logic coupled with the receive logic, the transmit logic to transmit, in response to the request, an authorization to the V2X UE to operate as a V2X proxy.

Example 44 may include the electronic device of example 43 or some other example herein, wherein the request includes one or more of: an indication of one or more proxy configuration parameters of the V2X UE, an indication of one or more supported services identifiers (PSIDs), an indication of coverage area, and/or an indication of whether the V2X UE can operate out of the coverage area.

Example 45 may include the electronic device of example 43 or some other example herein, wherein the transmit logic is further to forward the request to one or more other V2X ProSe functions and/or external servers; and the receive logic is to receive an indication of authorization from the one or more other V2X ProSe functions and/or external servers.

Example 46 may include the electronic device of example 45 or some other example herein, wherein the authorization to the V2X UE includes the authorization from the one or more other V2X ProSe functions and/or external servers, an indication of a V2X Proxy configuration, an indication of a coverage area, an indication of an out of coverage authorization, and/or an indication of validity.

Example 47 may include the electronic device of example 43 or some other example herein, wherein the control logic is to implement the V2X ProSe function as a V2X specific functionality that is implemented as part of a ProSe function and/or as a standalone function.

Example 48 may include a method comprising: receiving, by a V2X proximity services (ProSe) function from a V2X user equipment (UE), a request for the V2X UE to operate as a V2X proxy in which the V2X UE is able to control V2X operation of one or more other V2X UEs; and transmitting, by the V2X ProSe function in response to the request, an authorization to the V2X UE to operate as a V2X proxy.

Example 49 may include the method of example 48 or some other example herein, wherein the request includes one or more of: an indication of one or more proxy configuration parameters of the V2X UE, an indication of one or more supported services identifiers (PSIDs), an indication of coverage area, and/or an indication of whether the V2X UE can operate out of the coverage area.

Example 50 may include the method of example 48 or some other example herein, further comprising forwarding, by the V2X ProSe function, the request to one or more other V2X ProSe functions and/or external servers; and receiving, by the V2X ProSe function, an indication of authorization from the one or more other V2X ProSe functions and/or external servers.

Example 51 may include the method of example 50 or some other example herein, wherein the authorization to the V2X UE includes the authorization from the one or more other V2X ProSe functions and/or external servers, an indication of a V2X Proxy configuration, an indication of a coverage area, an indication of an out of coverage authorization, and/or an indication of validity.

Example 52 may include the method of example 48 or some other example herein, wherein the V2X ProSe function is implemented as a V2X specific functionality that is implemented as part of a ProSe function and/or as a standalone function.

Example 53 may include an apparatus comprising means to perform one or more elements of a method described in or related to any of examples 1-26, 30-42, 48-52, and/or any other method or process described herein.

Example 54 may include one or more non-transitory computer-readable media comprising instructions to cause an electronic device, upon execution of the instructions by one or more processors of the electronic device, to perform one or more elements of a method described in or related to any of examples 1-26, 30-42, 48-52, and/or any other method or process described herein.

Example 55 may include an apparatus comprising control logic, transmit logic, and/or receive logic to perform one or more elements of a method described in or related to any of examples 1-26, 30-42, 48-52, and/or any other method or process described herein.

Example 56 may include a method of communicating in a wireless network as shown and described herein.

Example 57 may include a system for providing wireless communication as shown and described herein.

Example 58 may include a device for providing wireless communication as shown and described herein.

The foregoing description of one or more implementations provides illustration and description, but is not intended to be exhaustive or to limit the scope of the claims to the precise form disclosed. Modifications and variations are possible in light of the above teachings or may be acquired from practice of various implementations.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a machine-readable medium having instructions thereon that when operated on by the machine cause the machine to perform operations that include a machine-readable medium having instructions thereon that when operated on by the machine cause the machine to perform operations that include receiving a proxy operation authorization at a first user equipment (UE) from a vehicle to anything (V2X) proximity services (ProSe) function for the first UE to operate as a Proxy UE for the ProSe function, controlling configuration information by the first UE of other UEs, controlling by the first UE a V2X operation mode.

Further embodiments include controlling cooperative messages transmission rates of the other UEs by the first UE.

In further embodiments the cooperative messages comprise basic safety messages (BSM).

Further embodiments include transmitting a V2X message from the proxy UE having a header that includes a field announcing that the proxy UE is operating as a proxy UE for a ProSe function.

In further embodiments the proxy UE operates as a proxy UE by performing V2X configuration functions within its coverage range on behalf of the V2X ProSe Function.

Further embodiments include verifying the credentials of the UE at the V2X ProSe function.

In further embodiments verifying the credentials comprises sending the credentials to the V2X ProSe function during initial service authorization, and wherein receiving a proxy authorization comprises receiving a proxy operation authorization at the proxy UE if the credentials are verified by the ProSe function.

In further embodiments the proxy UE is pre-configured with information to operate as a V2X Proxy In further embodiments the proxy UE requests proxy information from a ProSe function In further embodiments the ProSe function verifies the proxy UE by consulting external servers, for example. geolocation and International Traffic System (ITS) servers, to decide whether the proxy UE should be allowed to operate as a V2X Proxy.

Further embodiments include the proxy UE advertising its status as a V2X Proxy by sending messages using a header that indicates that the proxy UE is authorized as a V2X proxy.

In further embodiments the header has a bit set to indicate a V2X proxy status.

Some embodiments relate to processing circuitry of a user equipment (UE) in a vehicular environment. The processing circuitry is to detect the presence of a vehicle to anything (V2X) Proxy user equipment (UE) by a V2X UE, request, by the UE, the V2X Proxy UE to update V2X operation parameters of the UE, and if the V2X Proxy UE authorizes the new requested configuration, the UE receiving updated operation parameters for V2X from the V2X Proxy UE.

In further embodiments the request includes a V2X Proxy address as a destination address, the requested operational parameters in a V2X information element (IE), and the provider service identifiers (PSID(s)) to which the request applies.

Further embodiments include confirming reception of the operation parameters to the V2X Proxy by setting an A bit in a next V2X ProSe header transmission from the UE.

In further embodiments requesting comprises requesting through a wireless local area network interface for direct communication with the V2X Proxy UE.

In further embodiments the V2X Proxy UE has an ITS application, and sends the message received from the UE to the application.

In further embodiments sending the message comprises forwarding the messages through an eNB, to a ProSe/V2X function in the core network.

In further embodiments the V2X Proxy UE conditionally sends the message based on the message type and an indication in the media access control layer header.

In further embodiments the V2X Proxy UE authorizes the UE based on a subscription of the UE.

Further embodiments include receiving by the V2X Proxy UE from an mobility management entity (MME) a Proxy authorization indication in an S1 AP Initial Context Setup Request.

Further embodiments include receiving an Attach Request and/or Tracking Area Update Request message including a V2X Proxy capability indication as part of the "UE Network Capability" from the V2X Proxy UE and wherein requesting is performed after receiving the message.

Further embodiments include a UE with the processing circuitry and baseband logic to provide communication with the V2X proxy UE to receive the updated operation parameters.

Some embodiments relate to an apparatus that includes control logic of a vehicular user equipment (UE) to generate a registration request to operate as a vehicle to anything (V2X) proxy, and signaling logic coupled to the control logic to send the registration request to an enhanced node B (eNB) and to receive a response including an authorized V2X proxy configuration from the enB.

Further embodiments include a sensor coupled to the control logic to detect a safety condition and to provide the safety condition to the control logic, the signaling logic to send a basic safety message (BSM) based on the safety condition.

The invention claimed is:

1. A non-transitory machine-readable medium having instructions thereon that when operated on by a machine cause the machine to perform operations comprising:

receiving, at a first user equipment (UE) and from a vehicle to anything (V2X) proximity services (ProSe)

function, authorization for the first UE to send V2X configuration information to other UEs, wherein there is no direct connection between the V2X ProSe function and the other UEs;

receiving, from a network node and based on the authorization, the V2X configuration information including information for updating V2X operational parameters of the other UEs;

determining, without direct involvement of the network node, sidelink interface resources associated with the other UEs for communication of the V2X configuration information from the first UE to the other UEs;

communicating directly, by the first UE to the other UEs, on the sidelink interface resources via upper layer signaling only, the V2X configuration information received from the network node, wherein the first UE does not modify the V2X configuration information before sending the V2X configuration information to the other UEs; and controlling, by the first UE communicating the V2X configuration information, V2X operation of at least one of the other UEs.

2. The non-transitory machine-readable medium of claim 1, wherein the controlling of V2X operation by the first UE is by transmitting the V2X configuration information via a sidelink interface, associated with the sidelink interface resources, without direct involvement of the network node.

3. The non-transitory machine-readable medium of claim 1, wherein sending the V2X configuration information is via direct communication between pairs of UEs through a sidelink interface.

4. The non-transitory machine-readable medium of claim 1, wherein the first UE receives the V2X configuration information from the network node in a response message.

5. The non-transitory machine-readable medium of claim 1, wherein the V2X configuration information configures the other UEs to control message transmission.

6. The non-transitory machine-readable medium of claim 1, wherein the operations further comprise:

detecting, by the first UE, presence of the other UEs that are proximate to the first UE;

establishing a direct connection, by the first UE, with each of the other UEs; and communicating with the other UEs over the direct connection.

7. The non-transitory machine-readable medium of claim 1, wherein the operations further comprise:

controlling a transmission rate of cooperative messages of the other UEs by the first UE.

8. The non-transitory machine-readable medium of claim 7, wherein the cooperative messages comprise basic safety messages (BSMs).

9. The non-transitory machine-readable medium of claim 1, wherein a header of a packet used to send the V2X configuration information includes an indication that the first UE is authorized to send the V2X configuration information.

10. The non-transitory machine-readable medium of claim 1, wherein the updated V2X operational parameters of the other UEs include individual resource pool configurations.

11. Processing circuitry of a first user equipment (UE) in a vehicular environment, wherein the processing circuitry causes the first UE to:

receive, at the first UE and from a vehicle to anything (V2X) proximity services (ProSe) function, authorization for the first UE to send V2X configuration information to other UEs, wherein there is no direct connection between the V2X ProSe function and the other UEs;

receive, from a network node and based on the authorization, the V2X configuration information including information for updating V2X operational parameters of the other UEs;

determining, without direct involvement of the network node, sidelink interface resources associated with the other UEs for communication of the V2X configuration information from the first UE to the other UEs;

communicate directly, by the first UE to the other UEs, on the sidelink interface resources via upper layer signaling only, the V2X configuration information received from the network node, wherein the first UE does not modify the V2X configuration information before sending the V2X configuration information to the other UEs; and control, by the first UE communicating the V2X configuration information, V2X operation of at least one of the other UEs.

12. The processing circuitry of claim 11, wherein V2X operation is controlled by the first UE is by transmitting the V2X configuration information via a sidelink interface, associated with the sidelink interface resources, without direct involvement of the network node.

13. The processing circuitry of claim 11, wherein the V2X configuration information is sent via direct communication between pairs of UEs through a sidelink interface.

14. The processing circuitry of claim 11, wherein the first UE receives the V2X configuration information from the network node in a response message.

15. The processing circuitry of claim 11, wherein the V2X configuration information configures the other UEs to control message transmission.

16. The processing circuitry of claim 11, wherein the processing circuitry further causes the first UE to:

detect, by the first UE, presence of the other UEs that are proximate to the first UE;

establish a direct connection, by the first UE, with each of the other UEs; and communicate with the other UEs over the direction connection.

17. The processing circuitry of claim 11, wherein the processing circuitry further causes the first UE to:

control a transmission rate of cooperative messages of the other UEs.

18. The processing circuitry of claim 17, wherein the cooperative messages comprise basic safety messages (BSMs).

19. The processing circuitry of claim 11, wherein a header of a packet used to send the V2X configuration information includes an indication that the first UE is authorized to send the V2X configuration information.

20. A first user equipment (UE) at a vehicle comprising:

a processor; and a memory coupled to the processor, the memory comprising instructions that, when executed by the processor, cause the first UE to:

receive, from a vehicle to anything (V2X) proximity services (ProSe) function, authorization for the first UE to send V2X configuration information to other UEs, wherein there is no direct connection between the V2X ProSe function and the other UEs;

receive, from a network node and based on the authorization, the V2X configuration information including information to control a V2X operating mode of the other UEs or information for updating V2X operational parameters of the other UEs;

determine, without direct involvement of the network node, sidelink interface resources associated with the other UEs for communication of the V2X configuration information from the first UE to the other UEs;

communicate directly, to the other UEs, on the sidelink interface resources via upper layer signaling only, the V2X configuration information received from the network node, wherein the first UE does not modify the V2X configuration information before sending the V2X configuration information to the other UEs; and control, by communicating the V2X configuration information, V2X operation of at least one of the other UEs.

* * * * *